Jan. 15, 1929.  R. B. DERRYBERRY  1,698,990
AIR RELIEF VALVE
Filed Oct. 28, 1926
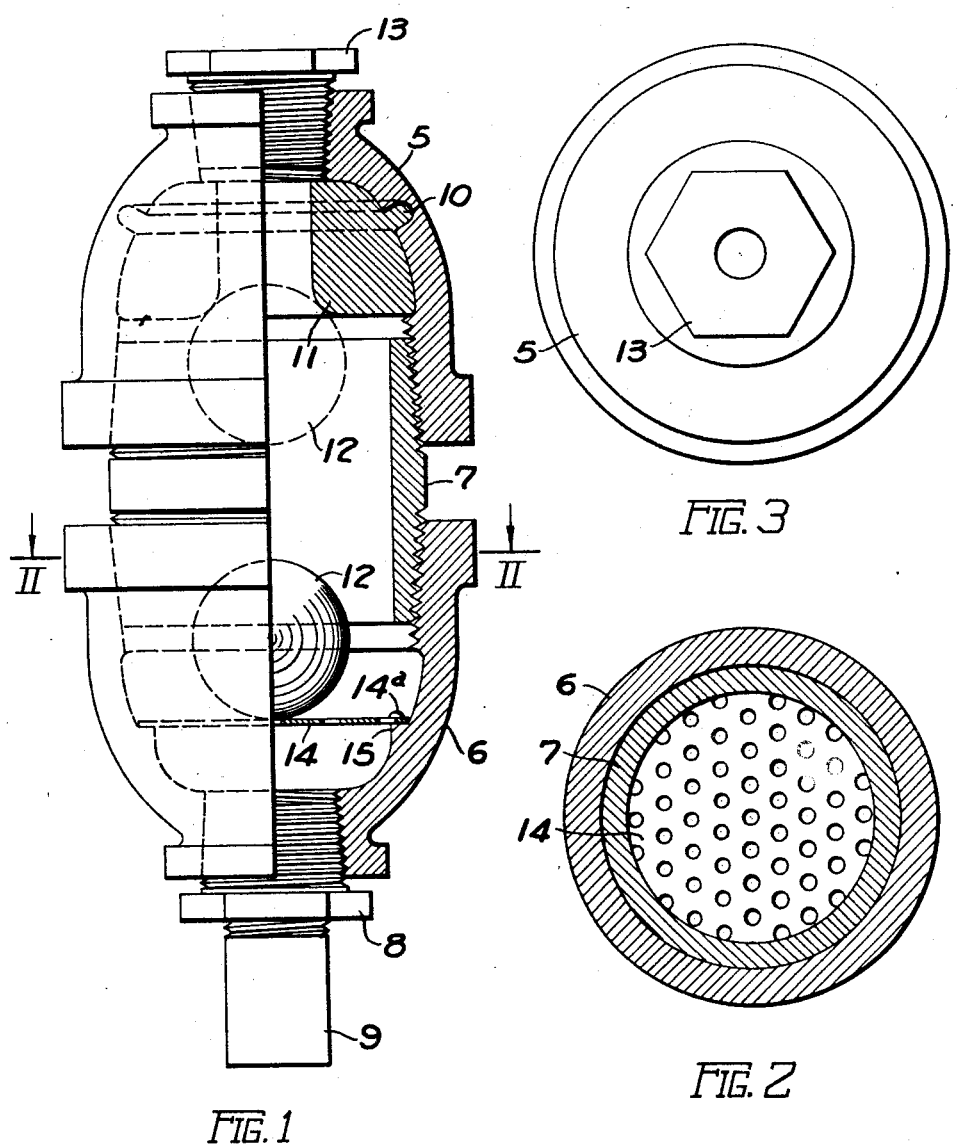
RAYMOND B. DERRYBERRY Patented Jan. 15, 1929.

1,698,990

UNITED STATES PATENT OFFICE.

RAYMOND B. DERRYBERRY, OF ANNISTON, ALABAMA, ASSIGNOR OF ONE-HALF TO EUGENE FIES, OF BIRMINGHAM, ALABAMA.

AIR-RELIEF VALVE.

Application filed October 28, 1926. Serial No. 144,875.

This invention has general reference to valves adapted to relieve the pressure of air or other gases in pipes or other containers of fluids, but relates more particularly to such valves which are especially suitable for use in connection with water mains to afford a vent for any air that may accumulate therein.

A primary object of the present invention is to produce a relief valve of the above general character which is adapted to be placed at a considerable distance from the fluid container with which it is connected, and which comprises a substantially globular float and a seat therefor, said float being adapted to be pressed against said seat by the pressure of the fluid, rather than solely as a result of the buoyancy of the float.

Another object is to provide in such a valve means by which the relative proportions of the inlet opening and the outlet opening readily may be varied.

And a still further object is to produce a valve having the characteristics aforesaid, and which will be simple, relatively inexpensive, and have few wearing parts.

In all of the so-called "air-relief" valves devised heretofore of which I have any knowledge, the float by which the vent is intended to be controlled is either formed of buoyant material or is large and of hollow construction and therefore is of itself buoyant to such an extent that its operation depends upon its buoyancy alone, and not upon the fluid pressure exerted against the float. In my improved valve construction I prefer to make use of a float which is hollow and formed of vulcanized rubber or other rigid material which is not subject to corrosion and is unlikely to accumulate foreign matter which might interfere with its satisfactory operation, the specific gravity of the float being approximately the same as that of the water or other fluid in connection with which it is used, so that the movement of the float towards or away from its seat is dependent upon the pressure of the fluid rather than upon the float being buoyant.

The means by which the foregoing and other objects are accomplished by my invention, and the manner of their accomplishment, readily will be understood from the following description on reference to the accompanying drawings, which depict a preferred embodiment of the invention, and in which:—

Fig. 1 is a view half in section and half in side elevation of the valve and a portion of its inlet pipe.

Fig. 2 is a sectional view take substantially on line II—II of Fig. 1.

Fig. 3 is a top plan view showing the bushing by which the area of the air vent is regulated.

As shown in the drawings, in which like parts are indicated by corresponding reference numerals throughout the various views, the body of the valve is made up of two substantially semi-globular hollow parts 5 and 6 connected by a screw-threaded nipple 7. At the inlet end of the part 6 a screw-threaded bushing 8 is removably inserted therein and an inlet pipe 9 has its threaded end screwed into said bushing. Near the top of the part 5 of the valve a groove 10 is initially formed therein and a valve seat 11 preferably of lead is placed in said part and is anchored therein by being extended into said groove, the seating face being suitably shaped to receive a globular float 12. The float walls are thick and rigid enough not to be appreciably deformed by the internal pressure so that it would tend to be pressed into the port in seat 11 and stick as the soft rubber balls will do. The outlet opening of the valve casing is screw-threaded for the reception of a bushing 13, which itself preferably is interiorly screw-threaded for the reception of an outlet pipe (not shown), though such outlet pipe may ordinarily be omitted since it is intended that the relief valve shall be at the surface of the ground and an extension of the outlet opening therefore will not be required. In use the inlet pipe 9 is suitably connected with the water main or other vessel and may be extended any desired distance therefrom. Near the lower end of the part 6 of the valve casing a screen 14 is placed therein, said screen being secured upon a shoulder 15 initially formed on the interior of the part 6, as by screws 14ª. In the case of a water main, such as is ordinarily placed in a trench, the outlet pipe would extend upward to the surface where it will be readily accessible and there would be no interference with the outlet opening. Normally the float 12 will rest upon the screen 14 and the outlet opening will be free so that air within the water main may escape through the pipe 9 and pass through the screen 14 around the float 12 and out through the outlet opening. It is important for the successful and satisfactory operation of a valve of this sort that certain predetermined relations be maintained between the cross-sectional area of the inlet opening and that of the outlet opening, and for this reason I have found in practice that it is desirable to place a bushing in each of said openings so that changes may be made when desirable in the relative sizes of said openings and thus a standard size of valve casing and float may be used under widely varying conditions without any change other than in the bushings placed in the inlet and outlet openings, respectively, and in the size of the inlet pipe.

Various modifications of minor details of the improvements disclosed herein doubtless readily will suggest themselves to those skilled in this art, but such modifications fall within the scope of my inventive rights, and my invention is not to be construed as being limited to any details not specifically set out in the claims.

Having thus fully described the invention, what I claim as new, and seek to secure by Letters Patent, is:—

1. An air relief valve formed of an intermediate externally threaded nipple, an inlet end having a threaded inlet port having access to an internal chamber, there being a shoulder in said chamber adjacent to the inlet port, and a flat screen screwed to said shoulder and forming a transverse foraminous partition across the inlet opening, an upper section internally threaded to screw over the nipple and having a reduced outlet port internally threaded, an interchangeable bushing screwed into the said latter outlet and having a port therein of materially less diameter than the inlet opening at the other end of the valve, a lead seat formed in said outlet section surrounding the outlet opening, and a float ball of hard vulcanized rubber mounted freely in the valve.

2. An air relief valve formed of an intermediate threaded nipple, an inlet end threaded to screw on the nipple and having a threaded inlet port having access to an internal chamber, a transverse foraminous partition across the inlet opening, an upper section threaded to screw on the nipple and having a reduced outlet port internally threaded, an interchangeable bushing screwed into the said latter outlet and having a port therein of materially less diameter than the inlet opening at the other end of the valve, a lead seat formed in said outlet section surrounding the outlet opening, and a float ball of relatively hard material mounted freely in the valve.

In testimony whereof I affix my signature.

RAYMOND B. DERRYBERRY.